April 30, 1968  N. SPIELBERG  3,381,127
METHOD OF PRODUCING X-RAY INTERFERENCE
PATTERNS AND X-RAY HOLOGRAMS
Filed April 1, 1965
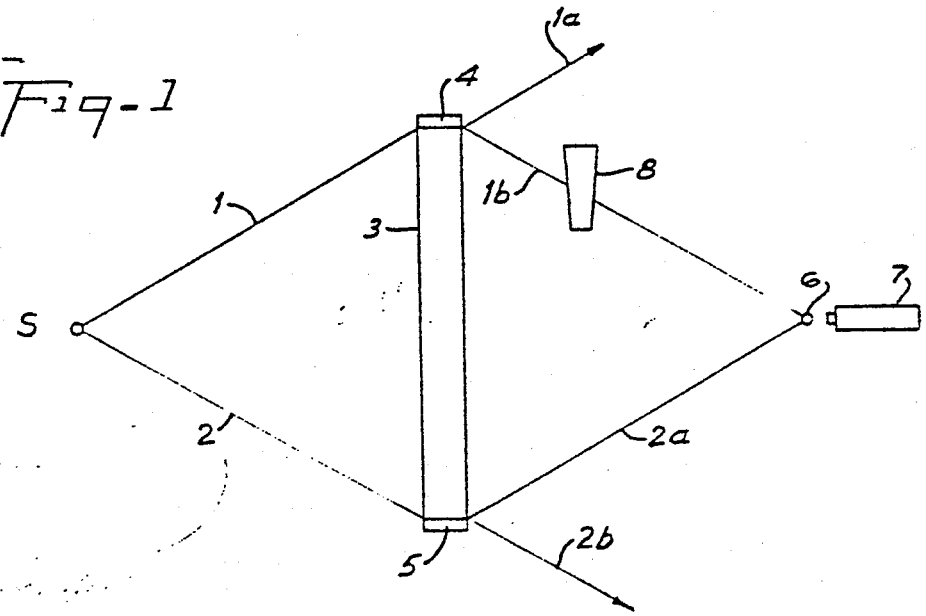
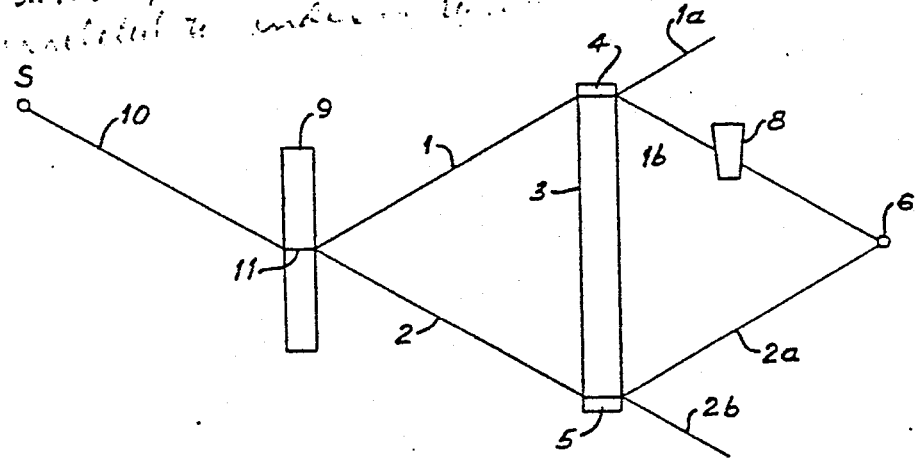
INVENTOR.
NATHAN SPIELBERG
BY
AGENT 3,381,127
METHOD OF PRODUCING X-RAY INTERFERENCE
PATTERNS AND X-RAY HOLOGRAMS
Nathan Spielberg, Hartsdale, N.Y., assignor to North
American Philips Company, Inc., New York, N.Y.,
a corporation of Delaware
Filed Apr. 1, 1965, Ser. No. 444,547
8 Claims. (Cl. 250—65)

ABSTRACT OF THE DISCLOSURE

A method of obtaining X-ray interference patterns employing a highly perfect crystal to diffract two beams of X-rays which are converged to a point whereby they may interfere with each other. This method does not involve measuring changes in geometrical path lengths and enables the measurement of the index of refraction of materials for X-rays or the making of an X-ray hologram which may be scanned with coherent visible or infra-red radiation to produce a magnified X-ray image of the original object.

My invention relates to a method of obtaining X-ray interference patterns.

In U.S. Patent 2,999,931 a method of obtaining an interference pattern with X-rays is disclosed. In this method, a beam of X-rays impinge upon a diffracting crystal so positioned that a portion of the X-rays is diffracted toward one reflecting crystal while another portion is transmitted toward another reflecting crystal. Upon being reflected by the respective reflecting crystals, the reflected X-ray beams are recombined to create an interference pattern.

This method has an inherent difficulty in that the geometrical path lengths which are travelled by the diffracted and reflected beams of X-rays must be measured with great precision. Since X-rays have wave lengths (~1 A.) which are very, very much shorter than visible light (~300-600 A.), very small differences in the geometrical lengths of the paths traversed by the transmitted and reflected rays results in an interference pattern and thus, phase shifts are virtually undetectable.

It is a principal object of my invention to provide a method of obtaining X-ray interference patterns which does not involve measuring changes in geometrical path lengths of two beams of X-rays derived from a common source.

It is another object of my invention to provide a method of obtaining X-ray interference patterns in which small phase shifts between two beams of X-rays derived from a common source can be measured.

It is a further object of my invention to provide a method of measuring the index of refraction for X-rays of materials utilizing an X-ray interference pattern.

It is a still further object of my invention to provide a method of making an X-ray hologram which may be scanned with coherent visible or infra-red radiation to produce a magnified X-ray image of the original object.

These and further objects of the invention will appear as the specification progresses.

In accordance with the invention, I employ a highly perfect thick crystal such as used to demonstrate anomalous transmission of X-rays (in, for example, Boris N. Batterman and Henderson Cole, Rev. of Modern Physics 36, 681–717 (1964) to diffract two beams of X-rays, the diffracted beams being converged to a common point where they may interfere with each other. At the point of detection they are either in phase, or have a fixed phase difference. Depending upon whether there is constructive or destructive interference, the intensity of radiation at the common point is determined by the phase difference.

In order to obtain an interference pattern which alters the original relationship of the two beams, a body which interacts with X-ray radiation, e.g. an absorber or scatterer is placed in the path of one of the beams of X-rays which, in effect, shortens the path for that beam of X-rays, with the result that there is a phase displacement of the X-rays in that path from those in the other path. This phase displacement is detectable as a change in intensity at the point at which the two beams interact.

This technique readily permits the index of refraction to X-rays of a substance to be measured. Thus, any material will scatter X-rays and hence shorten the path length of X-rays traversing this material. By interposing the material between the source and detector in one of the paths, and measuring the phase displacement of the X-rays traversing that path, the index of refraction of the material can be calculated.

Similarly, if it is desired to obtain an X-ray image of an object, it can be placed in the path of one of the X-ray beams, thereby producing an image of the object by X-ray diffraction i.e. X-ray microscopy by diffraction (see, for example, D. Gabor, Proc. Roy. Soc. (London), A197, 454 (1949); Proc. Phys. Soc., 64, 449–69). The diffracted image is combined with the unmodified beam of X-rays traversing the alternate path in order to produce an X-ray hologram which is produced by detecting the X-rays of the combined beams with a photographic film sensitive to X-rays. The hologram is then illuminated with coherent radiation in the visible or infrared region (as obtained, for example, from a laser) and the resulting image becomes the reconstruction of the original object with a magnification proportional to the ratio of the visible, or infrared wave length which is of the order of 10,000.

The invention will be described further with reference to the accompanying drawing in which:

FIG. 1 is a schematic representation of the device for carrying out the method according to the invention; and FIG. 2 is a schematic representation of another device for carrying out the method according to the invention.

Referring to the drawing, a point source of coherent X-rays S emits a beam of X-radiation of which rays 1 and 2 are shown to illustrate the invention. Rays 1 and 2 are incident upon a relatively thick, perfect crystal 3, for example quartz, silicon, germanium or copper, and are diffracted by planes 4 and 5 which are identical and parallel to each other. Upon passage through and leaving the crystal, rays 1 and 2 each are split into two rays 1a, 1b, 2a and 2b respectively. Since rays 1 and 2 arise from the same wave front, they are thus coherent with each other. Consequently, rays 1b and 2a will exhibit interference phenomena at their point of intersection 6 at which the rays converge and are detected by a thin photographic film or thin electronic detector 7.

If the path lengths of rays 1 and 1b and 2 and 2a are identical, which is the case in the illustrated arrangement, the rays 1b and 2a will be in phase. In order to obtain interference phenomena, a wedge of crystalline material is placed in the path of ray 1b. Since any crystalline material will diffract an X-ray, the path length of ray $1b$ will be altered resulting in a phase displacement of ray $2a$ with respect to $1b$. The resulting phase displacement is then a measure of the index of refraction of the material of wedge 8.

An alternative scheme to insure more accurate definition of rays 1 and 2 is to use a second or auxiliary perfect crystal 9 as a beam splitter between the source S and crystal 3. A ray 10 from source S impinges on a crystal plane 11 from which rays 1 and 2 emerge upon leaving crystal 9.

A magnified X-ray diffraction image can also be obtained of object 8 by placing a thin photographic film at 6 and recording an X-ray hologram which is produced by ray $1b$. The X-ray hologram is illuminated with coherent radiation in the visible or infrared region, for example by scanning the hologram with coherent light produced by a laser. The resulting image is a reconstruction of the original with a magnification proportional to the ratio of the visible wave length to the X-ray wave length, i.e. of the order of 10,000.

It will be obvious to those skilled in this art that crystals 3 and 9 in FIG. 2 do not have to be separate crystals but may be a single crystal in which a channel has been cut to provide, in effect, two crystals supported by a common base. It will also be obvious that object 8 may be placed in the path of beams 1 or 2, rather than $1b$ of FIG. 2 with the same result.

Therefore, while the invention has been described with reference to particular embodiments and applications thereof, other embodiments and applications will be obvious to those skilled in this art without departing from the spirit and scope of the invention as defined in the appended claims.

I claim:

1. A method of obtaining X-ray interference patterns comprising the steps of impinging two rays from a common source of X-rays respectively upon two identical parallel planes of a common perfect, relatively thick crystal, each of said rays being diffracted by the respective planes and leaving the crystal as two diffracted X-rays, selecting two diffracted X-rays which converge to a common point, and placing in the path of one of said diffracted X-rays a body of material which alters the length of the path traversed by said X-ray to thereby vary the phase relationship between said diffracted X-rays and to produce an interference pattern.

2. A method of determining the index of refraction for X-rays of a crystalline material comprising the steps of impinging two rays from a common source of coherent X-rays respectively upon two identical parallel planes of a common perfect, relatively thick crystal, each of said rays being diffracted by the respective planes and leaving the crystal as two diffracted X-rays, selecting two diffracted X-rays which converge to a common point, placing a specimen of the material in the path of one of said diffracted X-rays to produce an X-ray interference pattern in which the phase of said diffracted X-ray is displaced relative to the other ray, and measuring the phase displacement of the first ray with respect to the second as an indication of the index of refraction of the specimen.

3. A method of obtaining a magnified X-ray image of an object comprising the steps of impinging two rays from a common source of X-rays respectively upon two identical parallel planes of a common perfect, relatively thick crystal, each of said rays being diffracted by the respective planes and leaving the crystal as two diffracted X-rays, selecting two diffracted X-rays which converge to a common point, placing the object in the path of one of the diffracted X-rays, placing a thin photographic film sensitive to X-rays at the point of convergence of the two diffracted X-rays to record an X-ray hologram produced by the interference between the X-ray passing through the object and the other diffracted X-ray, and illuminating the thus-produced hologram with coherent radiation having a wave length much longer than the wave length of the X-rays producing the hologram to produce a magnified image of said object.

4. A method of obtaining a magnified X-ray image of an object comprising the steps of impinging two rays from a common source of X-rays respectively upon two identical parallel planes of a common perfect, relatively thick crystal, each of said rays being diffracted by the respective planes and leaving the crystal as two diffracted X-rays, selecting two diffracted X-rays which converge to a common point, placing the object in the path of one of the diffracted X-rays, placing a thin photographic film sensitive to X-rays at the point of convergence of the two diffracted X-rays to record an X-ray hologram produced by the interference between the X-ray passing through the object and the other diffracted X-ray, and illuminating the thus-produced hologram with coherent visible radiation to produce a magnified visible X-ray image of said object.

5. A method of obtaining a magnified X-ray image of an object comprising the steps of impinging two rays from a common source of X-rays respectively upon two identical parallel planes of a common perfect, relatively thick crystal, each of said rays being diffracted by the respective planes and leaving the crystal as two diffracted X-rays, selecting two diffracted X-rays which converge to a common point, placing the object in the path of one of the diffracted X-rays, placing a thin photographic film sensitive to X-rays at the point of convergence of the two diffracted X-rays to record an X-ray hologram produced by the interference between the X-ray passing through the object and the other diffracted X-ray, and illuminating the thus-produced hologram with coherent infrared radiation to produce a magnified image of said object.

6. A method of producing X-ray interference patterns comprising the steps of impinging an X-ray from a source on a plane of a first perfect, relatively thick crystal, said ray being diffracted and leaving said crystal as two coherent rays diverging from said plane, intercepting said rays with a second perfect, relatively thick crystal, each of said rays being diffracted by and leaving said second crystal as two diverging rays, selecting two of the latter rays which intersect at a common point, and placing a body of material in the path of one of the converging rays leaving the second crystal to alter the phase relationship between those two rays and thereby produce an interference pattern, and detecting said alteration of the phase relationship as a change in intensity with a thin X-ray detector placed at said common point.

7. A method of producing X-ray interference patterns comprising the steps of impinging an X-ray from a source on a plane of a first perfect, relatively thick crystal, said ray being diffracted and leaving said crystal as two coherent rays diverging from said plane, intercepting said rays with a second perfect, relatively thick crystal, each of said rays being diffracted by and leaving said second crystal as two diverging rays, selecting two of the latter rays which intersect at a common point, and placing a body of material in the path of one of the diverging rays leaving the first crystal to alter the phase relationship between those two rays and thereby produce an interference pattern, and detecting said alteration of the phase relationship as a change in intensity with a thin X-ray detector placed at said common point.

8. A method of obtaining X-ray interference patterns comprising the steps of impinging two rays from a common source of X-rays respectively upon two identical parallel planes of a common perfect, relatively thick crystal, each of said rays being diffracted by the respective planes and leaving the crystal as two diffracted X-rays, selecting two diffracted X-rays which converge to a common point, and placing in the path of one of said impinging X-rays a body of material which alters the length of the path traversed by said X-ray to thereby vary the phase relationship between said diffracted X-rays and to produce an interference pattern.

References Cited
UNITED STATES PATENTS
| | | | |
|---|---|---|---|
| 2,831,977 | 4/1958 | Henke | 250—51.5 |
| 2,999,931 | 9/1961 | Zingaro | 250—51.5 |

OTHER REFERENCES
"Effect of Finite Source Size, Radiation Bandwidth and Object Transmission in Microscopy, by A. V. Baez et al., from X-Ray Microscopy and Microradiography, edited by V. E. Cosslett et al., Academic Press, New York, 1957, pp. 347 to 353.

WILLIAM F. LINDQUIST, *Primary Examiner.*